(12) United States Patent
Chang et al.

(10) Patent No.: US 9,438,778 B2
(45) Date of Patent: Sep. 6, 2016

(54) IMAGE PICKUP DEVICE AND LIGHT FIELD IMAGE PICKUP LENS

(71) Applicant: Industrial Technology Research Institute, Hsinchu (TW)

(72) Inventors: Chuan-Chung Chang, Hsinchu County (TW); Kuang-Vu Chen, Taipei (TW); Yen-Chang Wang, Taoyuan County (TW); Hsin-Yueh Sung, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 67 days.

(21) Appl. No.: 14/583,785

(22) Filed: Dec. 29, 2014

(65) Prior Publication Data

US 2016/0044216 A1   Feb. 11, 2016

Related U.S. Application Data

(60) Provisional application No. 62/034,795, filed on Aug. 8, 2014.

(30) Foreign Application Priority Data

Dec. 12, 2014   (TW) .............................. 103143493 A

(51) Int. Cl.
| | |
|---|---|
| *G02B 13/16* | (2006.01) |
| *H04N 5/225* | (2006.01) |
| *H04N 9/73* | (2006.01) |
| *H04N 9/083* | (2006.01) |
| *G02B 27/00* | (2006.01) |
| *G06T 5/50* | (2006.01) |

(Continued)

(52) U.S. Cl.
CPC ............ *H04N 5/2254* (2013.01); *G02B 13/16* (2013.01); *G02B 27/0075* (2013.01); *G06T 5/50* (2013.01); *G02B 3/0056* (2013.01); *G02B 9/12* (2013.01); *G02B 13/0035* (2013.01)

(58) Field of Classification Search
None
See application file for complete search history.

(56) References Cited

U.S. PATENT DOCUMENTS

| 7,732,744 B2 | 6/2010 | Utagawa |
| 7,872,796 B2 | 1/2011 | Georgiev |

(Continued)

FOREIGN PATENT DOCUMENTS

| CN | 103119516 | 5/2013 |
| JP | 2012205111 | 10/2012 |

(Continued)

OTHER PUBLICATIONS

Oberdorster et al., "Correcting Distortion and Braiding of Micro-Images from Multi-Aperture Imaging Systems," Proc. of SPIE-IS &T, 2011, pp. 78750B-1-78750B-13.

(Continued)

*Primary Examiner* — Aung S Moe
*Assistant Examiner* — Euel Cowan
(74) *Attorney, Agent, or Firm* — Jianq Chyun IP Office

(57) ABSTRACT

An image pickup device including an imaging lens, an image sensor, and a multiple aperture optical element is provided. The multiple aperture optical element is disposed on a light path between the imaging lens and the image sensor, and includes aperture elements arranged in an array. A ratio of an image side f-number of the imaging lens to an object side f-number of the imaging lens is within a range of 0.25 to 2. A light field image pickup lens is also provided.

14 Claims, 7 Drawing Sheets

(51) Int. Cl.
　　　*G02B 9/12*　　　(2006.01)
　　　*G02B 13/00*　　(2006.01)
　　　*G02B 3/00*　　　(2006.01)

(56) References Cited

U.S. PATENT DOCUMENTS

| | | | |
|---|---|---|---|
| 7,962,033 | B2 | 6/2011 | Georgiev et al. |
| 8,102,459 | B2 | 1/2012 | Hayasaka et al. |
| 8,289,440 | B2 | 10/2012 | Knight et al. |
| 8,325,241 | B2 | 12/2012 | Yoshioka |
| 8,497,934 | B2 | 7/2013 | Milnes et al. |
| 8,514,318 | B2 | 8/2013 | Hiasa et al. |
| 8,831,377 | B2 | 9/2014 | Pitts et al. |
| 8,836,844 | B2 | 9/2014 | Hiasa et al. |
| 2010/0265385 | A1 | 10/2010 | Knight et al. |
| 2011/0129165 | A1 | 6/2011 | Lim et al. |
| 2011/0218448 | A1 | 9/2011 | Buntic |
| 2013/0033636 | A1 | 2/2013 | Pitts et al. |
| 2013/0057749 | A1* | 3/2013 | Hiasa .............. G02B 7/346 348/340 |
| 2014/0125810 | A1 | 5/2014 | D'Amico et al. |
| 2014/0146201 | A1 | 5/2014 | Knight et al. |

FOREIGN PATENT DOCUMENTS

| | | |
|---|---|---|
| TW | 200823595 | 6/2008 |
| TW | 201426018 | 7/2014 |

OTHER PUBLICATIONS

Oberdorster et al., "Adaptive DOF for Plenoptic Cameras," SPIE-IS&T, 2013, pp. 88671R-1-88671R-12.

Lumsdaine et al., "Full Resolution Lightfield Rendering," Adobe Technical Report, Jan. 2008, pp. 1-11.

Georgiev et al., "Focused Plenoptic Camera and Rendering," IEEE International Conference on Computational Photography (ICCP), 2009, pp. 1-8.

Georgiev et al., "Reducing Plenoptic Camera Artifacts," Computer Graphics Forum, 2010, pp. 1955-1968.

Raytrix GmbH, "Raytrix GmbH Camera Technology," 2011, pp. 1-36.

Wai-San Chan et al., "Extending the Depth of Field in a Compound-Eye Imaging System with Super-Resolution Reconstruction," 18th International Conference on Pattern Recognition, 2006, pp. 623-626.

Ren Ng, "Fourier Slice Photography," ACM, 2005, pp. 735-744.

Perwaβ et al., "Single Lens 3D-Camera with Extended Depth-of-Field," Proc. SPIE, 2012, vol. 8291.

Arai et al., "Integral three-dimensional image capture equipment with closely positioned lens array and image sensor," Optics letters, Jun. 15, 2013, pp. 2044-2046.

"Office Action of Taiwan Counterpart Application", issued on Jun. 20, 2016, p. 1-p. 3, in which the listed references were cited.

* cited by examiner

IMAGE PICKUP DEVICE AND LIGHT FIELD IMAGE PICKUP LENS

CROSS-REFERENCE TO RELATED APPLICATION

This application claims the priority benefits of U.S. provisional application Ser. No. 62/034,795, filed on Aug. 8, 2014 and Taiwan application serial no. 103143493, filed on Dec. 12, 2014. The entirety of each of the above-mentioned patent applications is hereby incorporated by reference herein and made a part of this specification.

TECHNICAL FIELD

The technical field relates to an optical device, and particularly relates to an image pickup device and a light field image pickup lens.

BACKGROUND

When a general camera is used to obtain information of an object in a space, a lens thereof is generally focused to a particular object distance to pickup a clear image of the object on such object distance. Regarding objects of other object distances, if the objects are within a coverage of a depth of field, clear images of the objects can still be obtained. However, if the objects are out of the coverage of the depth of field, unclear object images are obtained.

Moreover, regarding distribution and configuration information of each of the objects in the space, the general camera only obtains two-dimensional (2D) information of the object corresponding to a certain viewing angle, which is lack of distribution information of each of the objects in a depth direction. Therefore, based on the 2D image obtained by the general camera, distribution of each of the objects in the three-dimensional (3D) space cannot be sufficiently learned.

Therefore, a light field camera is developed, which is capable of sufficiently obtain distribution and configuration information of each of the objects in the 3D space. However, in the present light field camera, regardless of whether a lens array method or a lens set array method is used, a system pixel usage rate thereof is relatively low due to that each sub image has a trend of crosstalk minimization, which influences a pixel number of a final output image of the light field camera. For example, the pixel number of the output image of the light field camera is about 10% to 65% of the pixel number of the used image sensor.

SUMMARY

An embodiment of the disclosure provides an image pickup device including an imaging lens, an image sensor, and a multiple aperture optical element. The multiple aperture optical element is disposed on a light path between the imaging lens and the image sensor, and includes a plurality of aperture elements arranged in an array. A ratio of an image side f-number of the imaging lens and an object side f-number of the imaging lens is within a range of 0.25 to 2, and the image pickup device satisfies:

$$0.7L < \frac{D \times b}{P - a} < 1.06L,$$

where L is a pitch of the aperture elements, D is a diameter of an exit pupil of the imaging lens, P is a distance between the exit pupil of the imaging lens and an image plane of the imaging lens, a is a distance value from the image plane of the imaging lens to a front principal plane of the multiple aperture optical element, and b is a distance between a back principal plane of the multiple aperture optical element and an imaging plane on the image sensor. Moreover, when the image plane of the imaging lens is located at one side of the front principal plane away from the image sensor, the value of a is negative, and when the image plane of the imaging lens is located at one side of the front principal plane close to the image sensor, the value of a is positive.

An embodiment of the disclosure provides a light field image pickup lens including an imaging lens and a multiple aperture optical element. The imaging lens is disposed between an object side and an imaging plane of the light field image pickup lens. The multiple aperture optical element is disposed between the imaging lens and the imaging plane of the light field image pickup lens, and includes a plurality of aperture elements arranged in an array. A ratio of an image side f-number of the imaging lens to an object side f-number of the imaging lens is within a range of 0.25 to 2, and the light field image pickup lens satisfies:

$$0.7L < \frac{D \times b}{P - a} < 1.06L,$$

where L is a pitch of the aperture elements, D is a diameter of an exit pupil of the imaging lens, P is a distance between the exit pupil of the imaging lens and an image plane of the imaging lens, a is a distance value from the image plane of the imaging lens to a front principal plane of the multiple aperture optical element, and b is a distance between a back principal plane of the multiple aperture optical element and an imaging plane of the light field image pickup lens. Moreover, when the image plane of the imaging lens is located at one side of the front principal plane away from the image plane of the light field image pickup lens, the value of a is negative, and when the image plane of the imaging lens is located at one side of the front principal plane close to the image plane of the light field image pickup lens, the value of a is positive.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
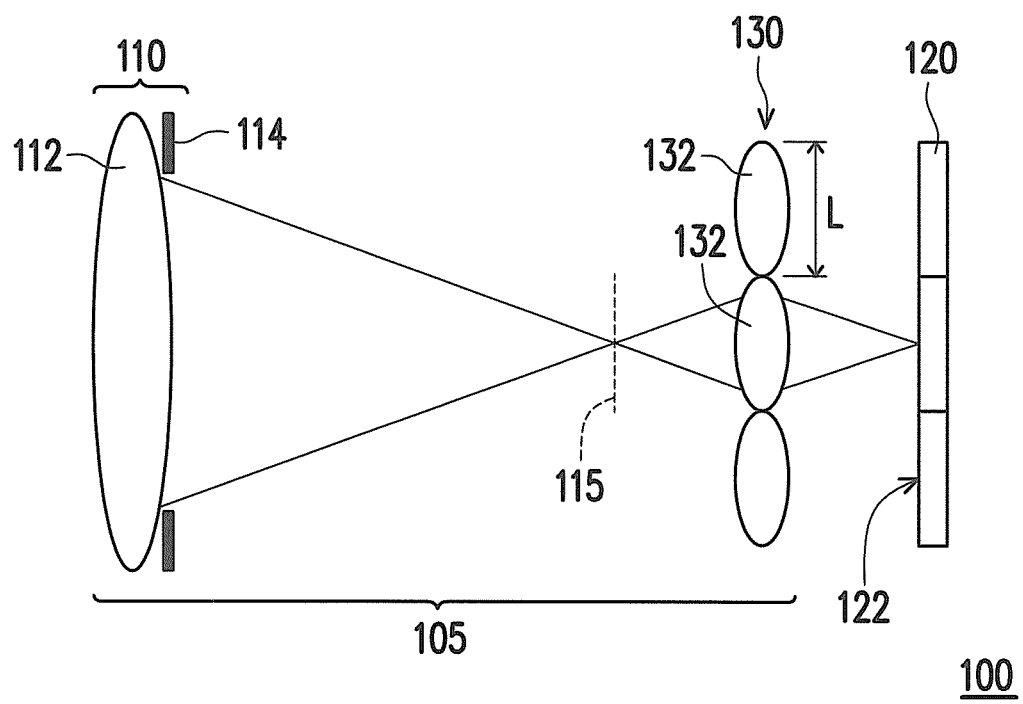
FIG. 1 is a cross-sectional view of an image pickup device according to an embodiment of the disclosure.
Figure 2:
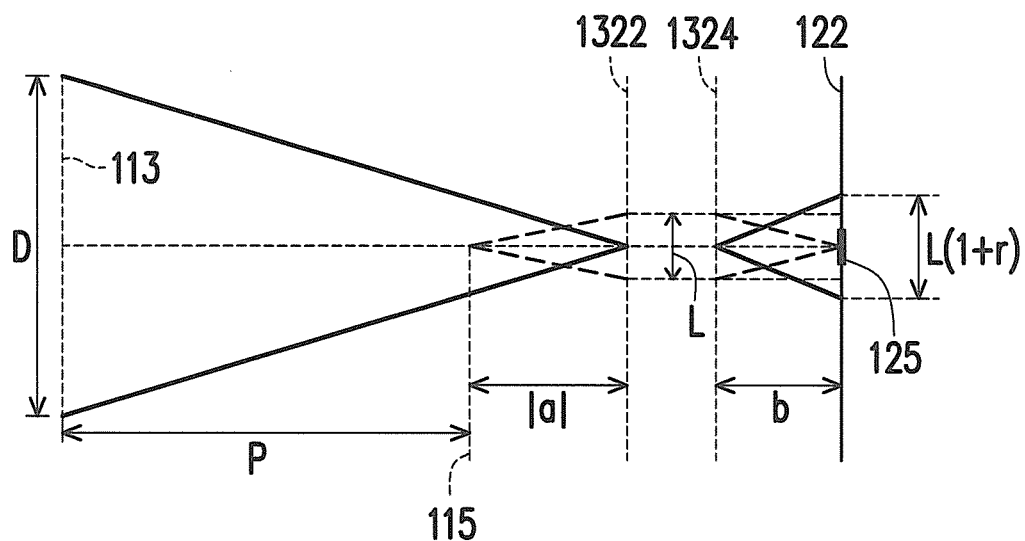
FIG. 2 is a schematic diagram of an exit pupil of an imaging lens, a front principal plane and a back principal plane of a multiple aperture optical element, an imaging plane of an image sensor and transmission of light between the above planes in the image pickup device of FIG. 1.
Figure 3:
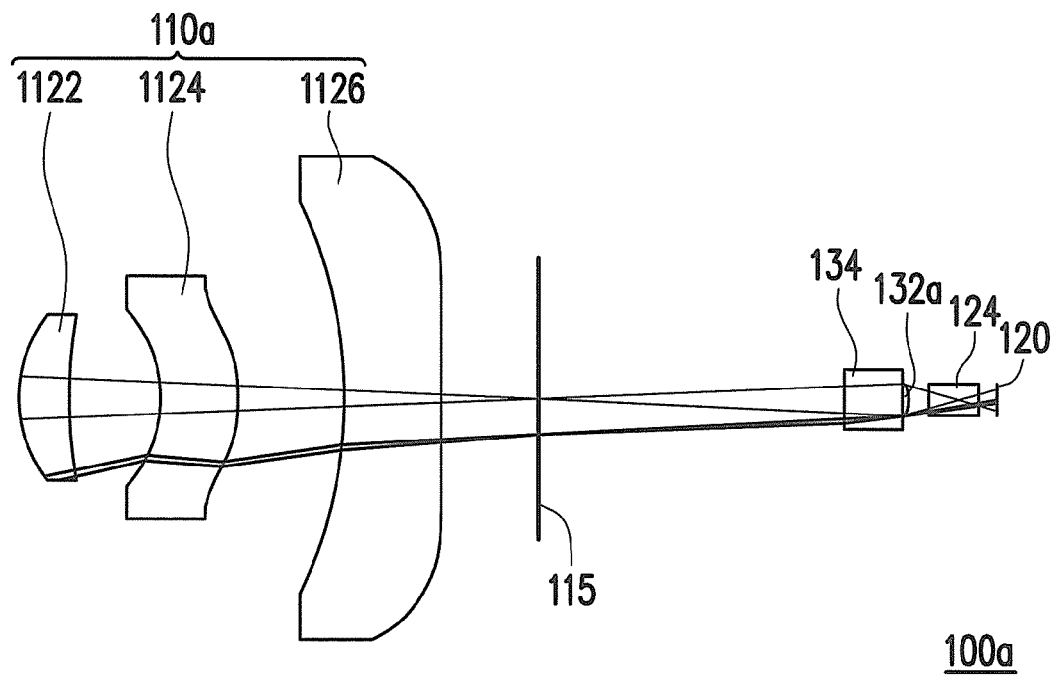
FIG. 3 is an example of the image pickup device of FIG. 1.

FIG. 1 is a cross-sectional view of an image pickup device according to an embodiment of the disclosure, FIG. 2 is a schematic diagram of an exit pupil of an imaging lens, a front principal plane and a back principal plane of a multiple aperture optical element, an imaging plane of an image sensor and transmission of light between the above planes in the image pickup device of FIG. 1, and FIG. 3 is an example of the image pickup device of FIG. 1. Referring to FIG. 1 and FIG. 2, the image pickup device 100 of the present embodiment includes a light field image pickup lens 105 and an image sensor 120, where the light field image pickup lens 105 includes an imaging lens 110 and a multiple aperture optical element 130. The imaging lens 110 may include at least one lens 112 and an aperture stop 114. For example, in the embodiment shown in FIG. 3, the imaging lens 110a may include a positive meniscus lens 1122, a negative meniscus lens 1124 and a negative meniscus lens 1126, though the disclosure is not limited thereto. Moreover, if the imaging lens 110 does not include the aperture stop 114 forming by a light-shielding element, an exit pupil and an entrance pupil of the imaging lens 110 can be still determined by a clear aperture of the lens.

The multiple aperture optical element 130 is disposed on a light path between the imaging lens 110 and the image sensor 120, and includes a plurality of aperture elements 132 arranged in an array. In the present embodiment, the multiple aperture optical element 130 is a lens array, and the aperture elements 132 are lenses arranged in an array. In FIG. 3, one lens (for example, the aperture element 132a) in the lens array is illustrated, and the aperture element 132a can be formed on a transparent plate 134. Moreover, the image pickup device 100a further includes a cover glass 124, where the cover glass 124 covers the image sensor 120 to protect the image sensor 120.

In the present embodiment, a ratio of an image side f-number of the imaging lens 110 to an object side f-number of the imaging lens 110 is within a range of 0.25 to 2. The image side f-number is defined as a value obtained by dividing a focal length of the imaging lens 110 by a diameter of the exit pupil of the imaging lens 110, and the object side f-number is defined as a value obtained by dividing the focal length of the imaging lens 110 by a diameter of the entrance pupil of the imaging lens 110.

Moreover, in the present embodiment, the image pickup device 100 satisfies:

$$0.7L < \frac{D \times b}{P - a} < 1.06L \qquad \text{equation (1)}$$

Where L is a pitch of the aperture elements 132, D is the diameter of the exit pupil 113 of the imaging lens 110, P is a distance between the exit pupil 113 of the imaging lens 110 and an image plane 115 of the imaging lens 110, a is a distance value from the image plane 115 of the imaging lens 110 to a front principal plane 1322 of the multiple aperture optical element 130 (which is represented in an absolute value in FIG. 2), where when the image plane 115 of the imaging lens 110 is located at one side of the front principal plane 1322 away from the image sensor 120 (i.e. a left side of the front principal plane 1322), the value of a is negative, and when the image plane 115 of the imaging lens 110 is located at one side of the front principal plane 1322 close to the image sensor 120 (i.e. a right side of the front principal plane 1322), the value of a is positive. Therefore, in the present embodiment, referring to FIG. 2, the value of a is negative. Moreover, b is a distance between a back principal plane 1324 of the multiple aperture optical element 130 and an imaging plane 122 on the image sensor 120. Namely, in the present embodiment, the front principal plane 1322 is located between the image plane 115 of the imaging lens 110 and the back principal plane 1324, and the back principal plane 1324 is located between the front principal plane 1322 and the imaging plane 122 on the image sensor 120. Moreover, in the present embodiment, the imaging plane 122 on the image sensor 120 is an imaging plane of the light field image pickup lens 105.

In the present embodiment, the aperture elements 132 respectively image the exit pupil 113 of the imaging lens 110 on the imaging plane 122 on the image sensor 120 to form a plurality of sub images 135 (shown in FIG. 6), where the adjacent sub images 135 are partially overlapped to each other.

Since the image pickup device 100 and the light field image pickup lens 105 satisfy $$0.7L < \frac{D \times b}{P - a} < 1.06L,$$

the sub images 135 formed by the multiple aperture optical element 130 are relatively large and are partially overlapped to each other properly. Therefore, the non-overlapped part of each of the sub images 135 can be effectively used to serve as image information to be obtained, so as to increase a valid usage area of image and increase a valid usage area of the image sensor 120. An embodiment is provided below for description.

Figure 4:
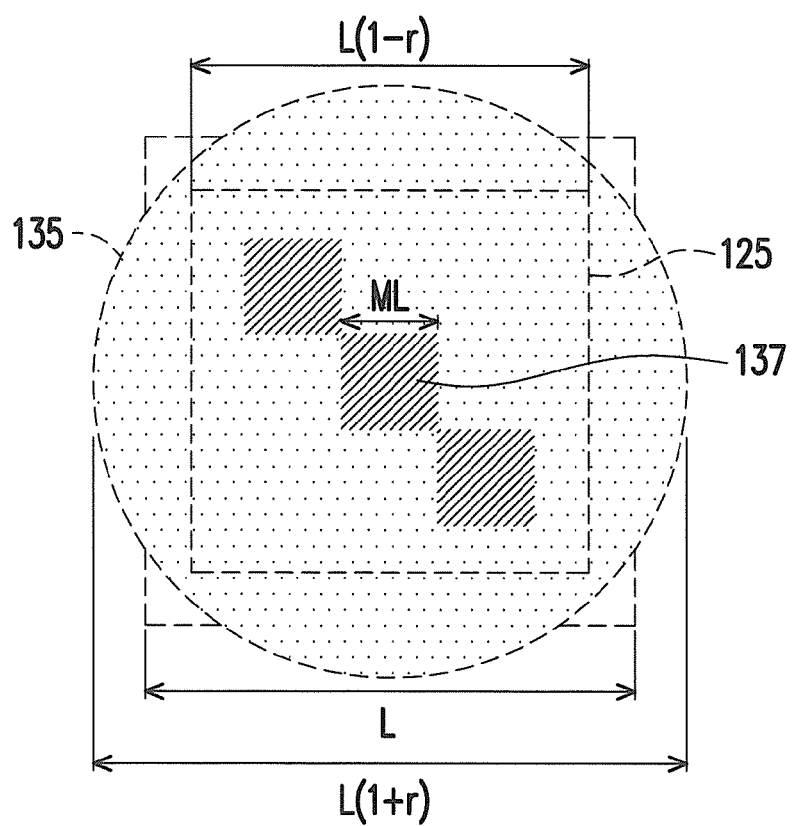
FIG. 4 is a comparison diagram of a pitch of aperture elements, a sub image and a valid usage area of the sub image for an image sensor in the image pickup device of FIG. 1.
Figure 5:
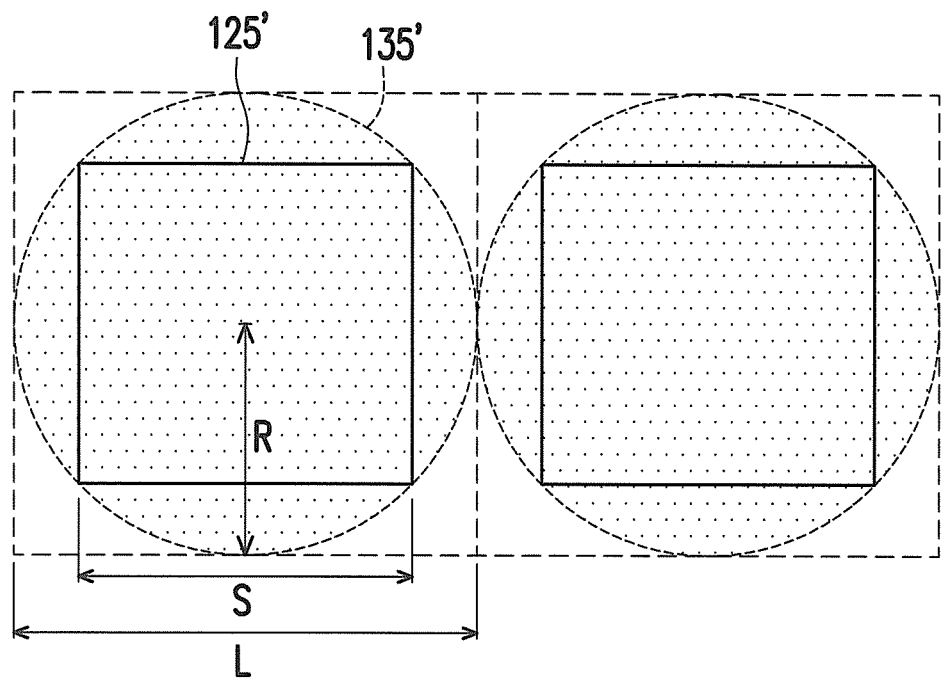
FIG. 5 is a comparison diagram of a pitch of aperture elements, sub images and a valid usage area of one sub image for the image sensor when the sub images are not overlapped.
Figure 6:
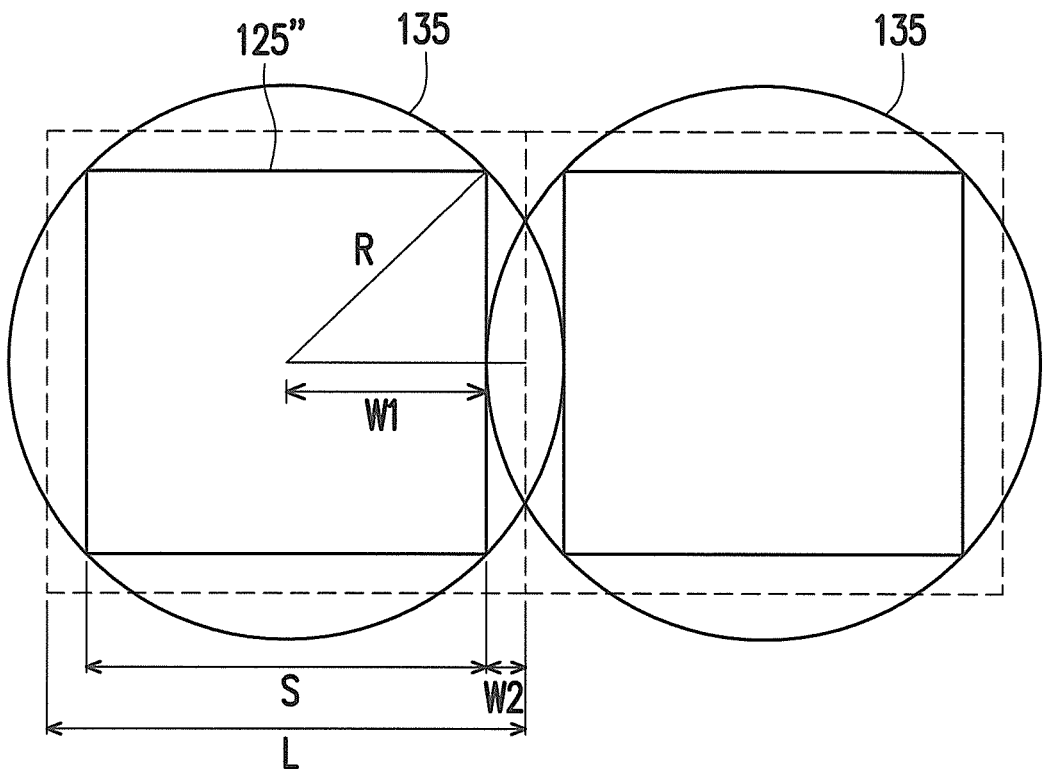
FIG. 6 and FIG. 7 are comparison diagrams of a pitch of aperture elements, sub images and valid usage areas of one sub image for the image sensor and overlapping degrees of two sub images in the image pickup device of FIG. 1.

FIG. 4 is a comparison diagram of the pitch of the aperture elements, a sub image and a valid usage area of the sub image for the image sensor in the image pickup device of FIG. 1, FIG. 5 is a comparison diagram of the pitch of the aperture elements, sub images and a valid usage area of one sub image for the image sensor when the sub images are not overlapped, and FIG. 6 is a comparison diagram of the pitch of the aperture elements, sub images and a valid usage area of one sub image for the image sensor and an overlapping degree of two sub images in the image pickup device of FIG. 1. Referring to FIG. 4, in the present embodiment, a width (for example, a diameter) of the sub image 135 is greater than the pitch L of the aperture elements, and in the image sensor 120, the valid usage area 125 of the sub image 135 is within a range encircled by an inscribed rectangle (for example, a square) of the sub image 135. It is assumed that a width of the valid usage area 125 is L(1−r), where r is a crosstalk ratio. Moreover, if a magnification of the aperture element 132 is M, L(1−r)≥NML, where N is a number of views of the light field image pickup lens 105, and different views 137 may contain image information of different viewing angles.

In this way, a relationship of M≤(1−r)/N is obtained. Therefore, if the adjacent sub images 135 are required to be partially overlapped, M≤1/N has to be satisfied.

As shown in FIG. 5, when the adjacent sub images 135' are not overlapped to each other, a radius R of the sub image 135' satisfies 0.5L≥R≥0. Now, a side length S of an inscribed square 125' of the sub image 135' is 2×(0.707R)=1.414R. By substituting a maximum value 0.5L of R into the aforementioned equation, it is obtained that a maximum value of the side length S of the inscribed square 125' is 1.414×0.5L=0.707L.

On the other hand, in the present embodiment, when the adjacent sub images 135 are partially overlapped, it is assumed that a radius of the sub image 135 is R, and $$\frac{L}{2} = W1 + W2 = \frac{R}{\sqrt{2}} + \left(\frac{R}{2} - \frac{R}{2\sqrt{2}}\right),$$

where W1 and W2 are respectively two length sections shown in FIG. 6.

Therefore, the radius R of the sub image 135 satisfies (2−1.414)L≥R≥0.5L, and a side length S of an inscribed square 125" of the sub image 135 is S=2×(0.707R)=1.414R. Therefore, a maximum value of the side length S of the inscribed square 125" of the sub image 135 is 2×(1.414−1)L=0.828L. Therefore, compared to the inscribed square 125' of FIG. 5, an area of the inscribed square 125" of the present embodiment (i.e. FIG. 6) can be greater, i.e. the valid usage area 125 of the sub image 135 for the image sensor 120 can be larger.

Figure 7:
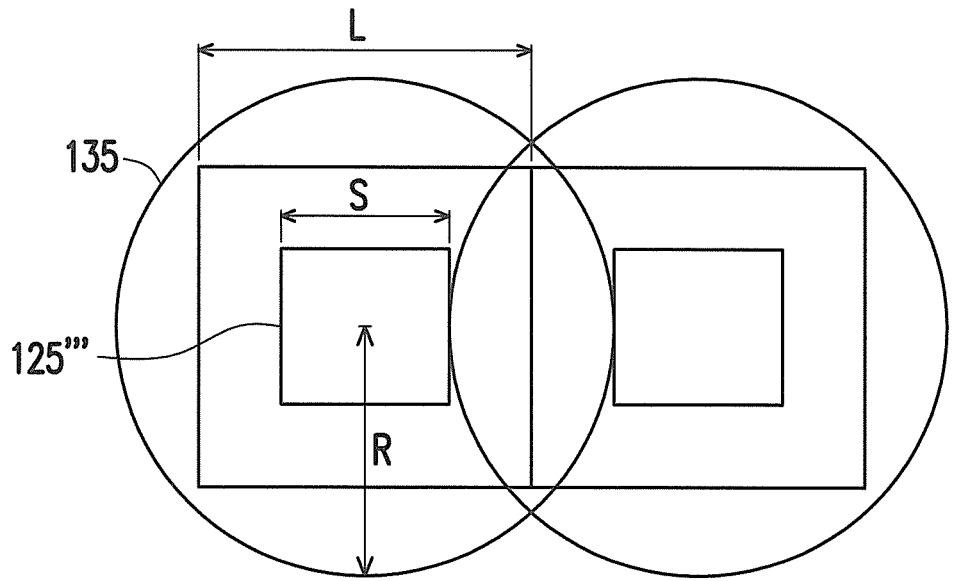

On the other hand, when L≥(2−1.414)L, the side length S of the valid usage area 125" is S=2(L−R). Therefore, the maximum value of the side length S of the valid usage area 125" is 2×(1.414−1)L=0.828L, and a minimum value thereof is 0. The minimum value corresponds to a non-adopted situation since now the valid usage area 125" is zero, as shown in FIG. 7, namely, a partial overlapping degree of the sub image 135 cannot be too large to let the valid usage area 125" to be zero. Moreover, in case of the above maximum value, the valid usage area 125" is also larger than the area of the inscribed square 125' of FIG. 5. Therefore, it is known that by partially overlapping the adjacent sub images 135 properly, the valid usage area 125 of each of the sub images 135 for the image sensor 120 can be effectively increased, so as to increase a whole valid usage area of the image sensor 120.

Figure 8:
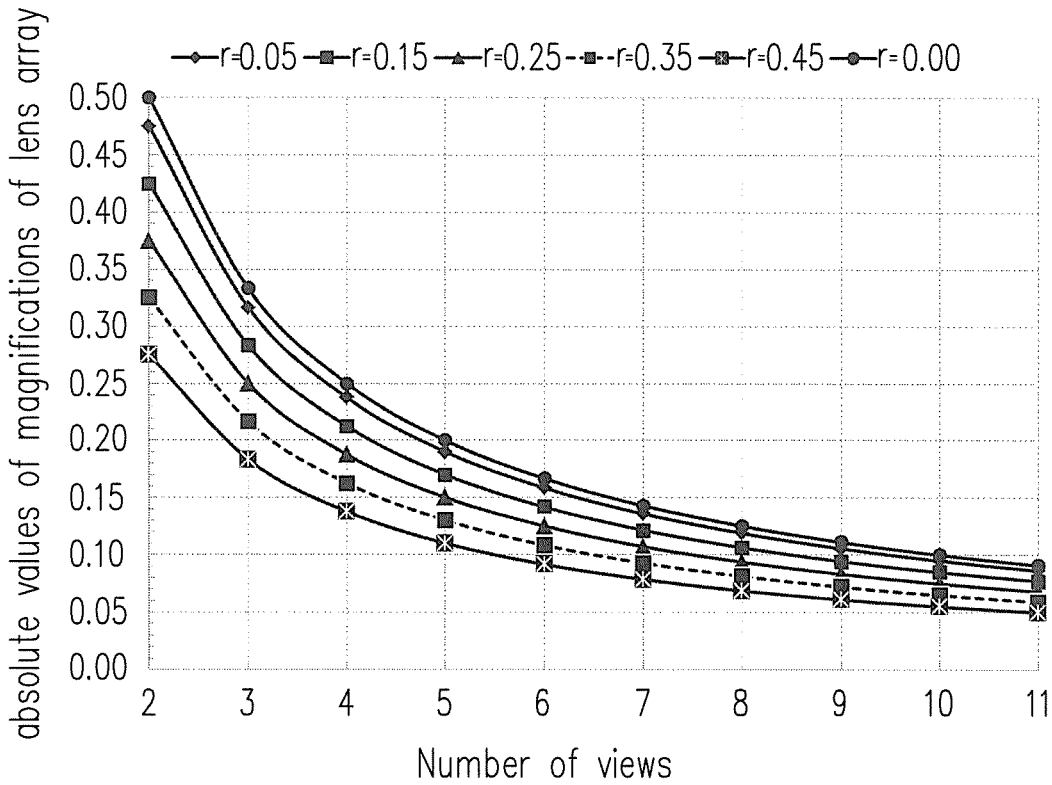
FIG. 8 is a curve diagram of absolute values of magnifications of aperture elements of FIG. 1 relative to a number of views of a sub image under different crosstalk ratios.

FIG. 8 is a curve diagram of absolute values of the magnifications of the aperture elements (i.e. a lens array) of FIG. 1 relative to a number of views of a sub image under different crosstalk ratios. According to FIG. 8, it is known that when an error tolerance of the crosstalk ratio r is required to be smaller, it represents that an error tolerance of the lens array on manufacture and assembly can be greater, and now the designed number of views is less.

As shown in FIG. 2, a reason that causes the crosstalk ratio r is that besides the aperture element 132 further images the image produced by the imaging lens 110 on the image plane 115 onto the imaging plane 122 on the image sensor 120 again, the aperture element 132 also images the exit pupil 113 of the imaging lens 110 onto the imaging plane 125 to form the sub image 135 with a diameter of L(1+r). According to a principle of similar triangles, a following equation (2) is obtained:

$$\frac{L(1+r)}{b} = \frac{D}{P-a} \quad \text{equation (2)}$$

Figure 9:
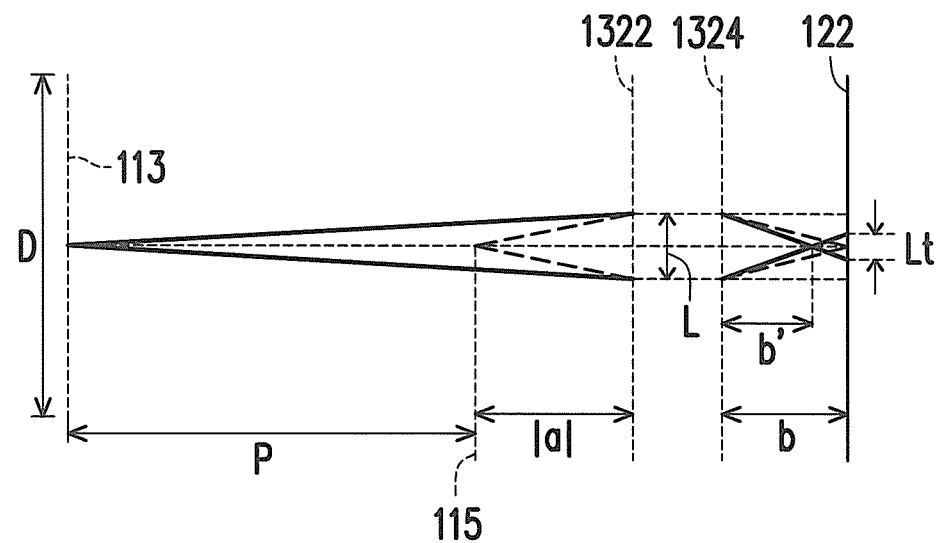
FIG. 9 is a cross-sectional view of another type of crosstalk ratio of the image pickup device of FIG. 1.

Moreover, there is another crosstalk ratio t that influences the crosstalk of the adjacent sub images 135, as shown in FIG. 9, regarding any point on the exit pupil 113 of the imaging lens 110, an image of the point that is formed on the imaging plane 122 on the image sensor 120 through the aperture element 132 is slightly spread, and a spreading width thereof is Lt. According to the principle of similar triangles, a following equation (3) is obtained:

$$t = \frac{|b' - b|}{b'} \quad \text{equation (3)}$$

Where, b' is a distance between the back principal plane 1324 of the aperture element 132 and an imaging plane where the exit pupil 113 of the imaging lens 110 is imaged through the aperture element 132.

When the crosstalk ratio r and the crosstalk ratio t are both considered, the valid usage area 125 of the sub image 135 for the image sensor 120 can be set as L(1−r−t). When r+t is greater than 0, L(1−r−t)≥NL|b/a|; and when r+t<0, L(1+r+t)≥NL|b/a|, where "| |" refers to take an absolute value of the value therein. After substituting r and t to the aforementioned equation (2) and the equation (3), the equation (1) is obtained.

Following table one and table two list some parameters of the image pickup device 100 of the present embodiment.

TABLE ONE

|  | example 1 | example 2 | example 3 | example 4 | example 5 |
|---|---|---|---|---|---|
| a (mm) | 37.7657 | −5.4679 | 40.1453 | 1.200 | 0.600 |
| b (mm) | 5.4325 | 1.0036 | 4.0145 | 0.616 | 0.200 |
| M | ~0.144 | ~−0.184 | ~0.100 | 0.513 | ~0.300 |
| N | 3 | 5 | 7 | 2.5 | 3 |
| Object side f-number | 2.89 | 2.89 | 2.79 | 2.71 | 2.51 |
| Image side f-number | 2.95 | 2.95 | 1.51 | 1.25 | 3.29 |
| L (mm) | 3.090 | 0.330 | 2.050 | 0.257 | 0.245 |
| D (mm) | 33.859 |  | 47.8222 | 3.858 | 1.280 |
| P (mm) | 97.11079 |  | 133.6967 | 10.41764 | 1.65 |
| Effective | 99.929 |  | 72.4462 | 4.811 | 4.22 |

TABLE ONE-continued

|  | example 1 | example 2 | example 3 | example 4 | example 5 |
|---|---|---|---|---|---|
| focal length of imaging lens (mm) |  |  |  |  |  |
| r | ~0 (>0) | ~0 (>0) | ~0 (>0) | ~0 (>0) | ~0 (>0) |
| t | ~0.09 | ~0.19 | ~0.06 | ~0.29 | ~0.28 |
| r + t | ~0.09 | ~0.19 | ~0.06 | ~0.29 | ~0.28 |
| Fr |  | ~1.021 | 0.541 | 0.461 | ~1.311 |
| Lens total length (mm) | ~119.8 | ~163.3 | ~207.2 | ~7.9 | ~4.1 |
| Value of middle expression of equation (1) | 1.003L | 1.003L | 1.001L | 0.999L | 0.995L |

TABLE TWO

| | Variation of example 5 | | | | | | |
|---|---|---|---|---|---|---|---|
|  | Variation 1 | Variation 2 | Variation 3 | Variation 4 | Variation 5 | Variation 6 | Variation 7 |
| L | 0.2408 | 0.2422 | 0.2436 | 0.245 | 0.2464 | 0.2478 | 0.2492 |
| r | 0.012 | 0.006 | 0.0008 | −0.004 | −0.011 | −0.016 | −0.022 |
| t |  |  |  | ~0.28 |  |  |  |
| r + t | ~0.292 | ~0.286 | ~0.28 | ~0.276 | ~0.269 | ~0.264 | ~0.258 |
| Value of middle expression of equation (1) | ~1.05 | ~1.01 | ~1.00 | ~0.995 | ~0.989 | ~0.984 | ~0.978 |
| Pixel usage rate for single whole image | ~50% | ~51% | ~52% | ~52% | ~53% | ~54% | ~55% |
| Total pixel usage rate |  | ~46% |  |  | ~43% |  |  |

In the table one, Fr refers to a ratio obtained by dividing the image side f-number by the object side f-number, and "Value of middle expression of equation (1)" refers to a value of a calculation result of $$\frac{D \times b}{P - a}.$$

Moreover, physical meanings of the other parameters in the above tables have been explained in the aforementioned description, and details thereof are not repeated. According to the table one and the table two, it is known that in all of the examples, the total crosstalk ratio r+t is smaller than 0.5. Besides, according to the table one, it is known that the image pickup device 100 of the present embodiment is adapted to various lens total lengths (from several millimeters to hundreds of millimeters). Moreover, according to the table one, it is known that the lens with the Fr value away from 1 is also applicable. In addition, in the table two, variations of the example 5 with the short lens total length are provided. When the lens total length is short, the image pickup device 100 can be applied to a portable electronic device.

In an embodiment, in order to achieve enough valid usage area 125, a ratio of the image side f-number of the imaging lens to the object side f-number of the imaging lens is within a range from 0.4 to 1.5. Moreover, in an embodiment, in order to achieve enough valid usage area 125, the image pickup device 100 satisfies:

$$0.98L < \frac{D \times b}{P - a} < 1.05L \quad \text{equation (4)}$$

Figure 10:
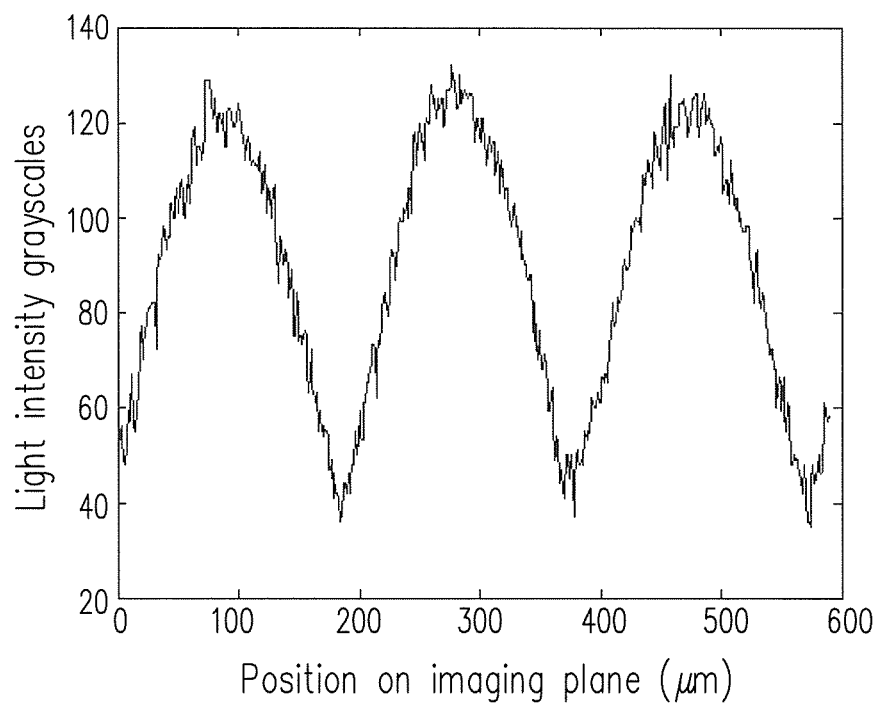
FIG. 10 is a distribution diagram of light intensity grayscales of sub image sensed by an image sensor of the image pickup device of FIG. 1.

FIG. 10 is a distribution diagram of light intensity grayscales of the sub image sensed by the image sensor of the image pickup device of FIG. 1. Referring to FIG. 10, when the pitch L of the aperture elements 132 is 260 μm, in an embodiment, the crosstalk ratio after normalization is 30%.

Figure 11:
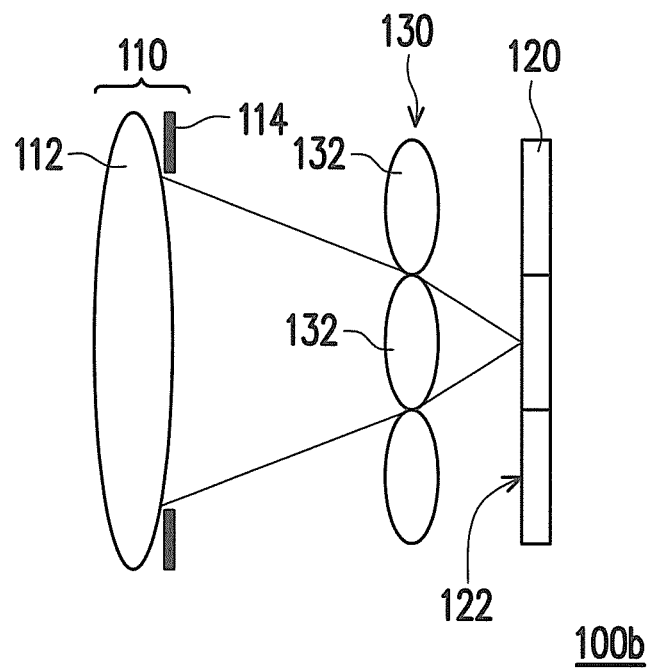
FIG. 11 is a cross-sectional view of an image pickup device according to another embodiment of the disclosure.

FIG. 11 is a cross-sectional view of an image pickup device according to another embodiment of the disclosure. Referring to FIG. 11, the image pickup device 100b of the present embodiment is similar to the image pickup device 100 of FIG. 1, but a difference therebetween is also as follows. In the image pickup device 100b of the present embodiment, the image plane of the imaging lens 110 is located at one side of the front principal plane 1322 (shown in FIG. 2) close to the image sensor 120 (i.e. the right side of the front principal plane 1322), so that the value of a is positive, though the image pickup device 100b still satisfies the aforementioned equation (1) or equation (4). The image pickup device 100 of FIG. 1 and the image pickup device 100b of the present embodiment all have a structure of a light field camera version 2.0.

Figure 12:
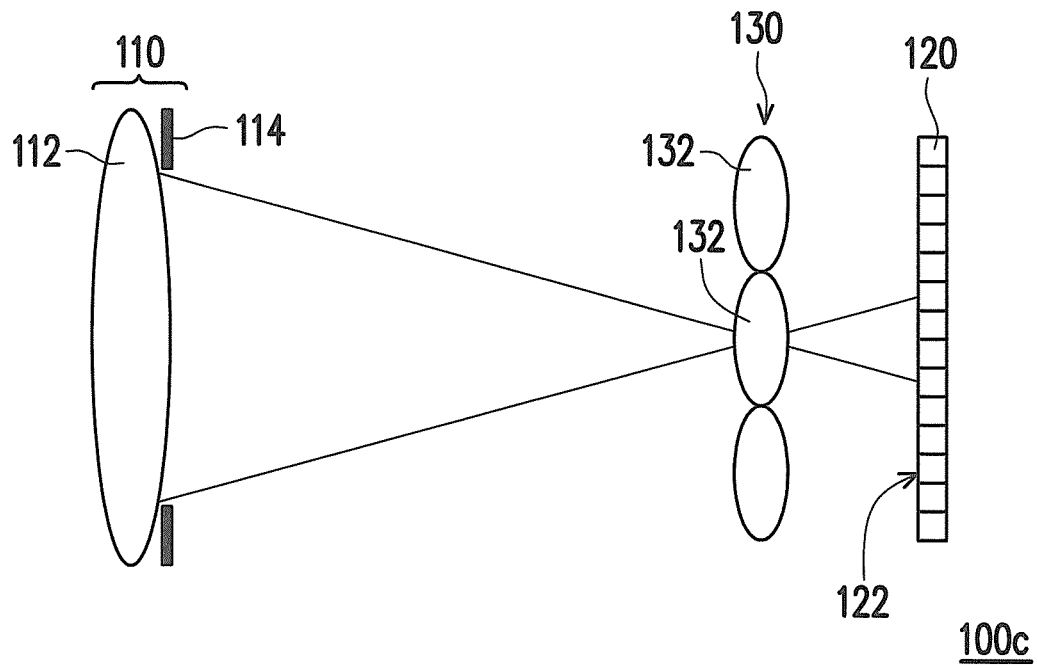
FIG. 12 is a cross-sectional view of an image pickup device according to still another embodiment of the disclosure.

FIG. 12 is a cross-sectional view of an image pickup device according to still another embodiment of the disclosure. Referring to FIG. 12, the image pickup device 100c of the present embodiment is similar to the image pickup device 100 of FIG. 1, but a difference therebetween is also as follows. In the image pickup device 100c of the present embodiment, the image plane of the imaging lens 110 falls at a position where the multiple aperture optical element 130 is located, and the image pickup device 100c has a structure of a light field camera version 1.0, though the image pickup device 100c still satisfies the aforementioned equation (1) or equation (4).

Figure 13:
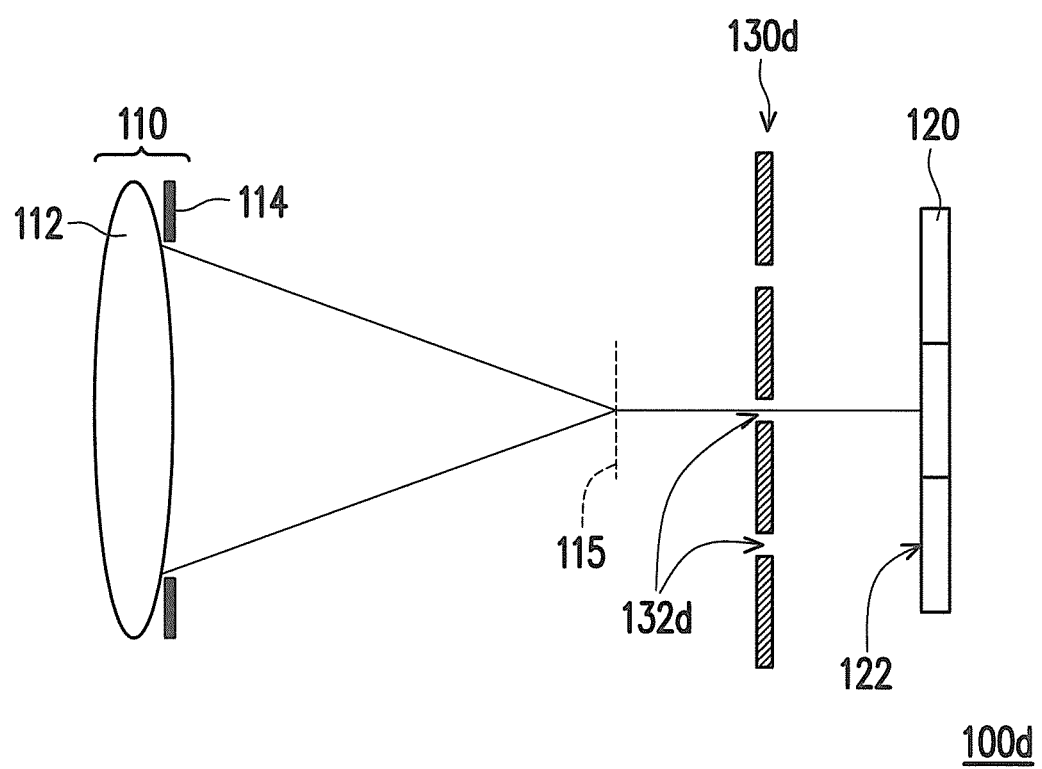
FIG. 13 is a cross-sectional view of an image pickup device according to yet another embodiment of the disclosure.

FIG. 13 is a cross-sectional view of an image pickup device according to yet another embodiment of the disclosure. Referring to FIG. 13, the image pickup device 100d of the present embodiment is similar to the image pickup device 100 of FIG. 1, but a difference therebetween is also as follows. In the image pickup device 100d of the present embodiment, the multiple aperture optical element 130d is a light shielding plate, and the aperture elements 132a are a plurality of light transmitting holes (for example, pinholes) arranged in an array, and the front principal plane and the back principal plane of the light shielding plate are substantially coincided. In other words, regarding the multiple aperture optical element 130d, the front principal plane and the back principal plane thereof all fall on a plane where the light transmitting holes are located. Now, the image pickup device 100d still satisfies the aforementioned equation (1) or the equation (4).

In summary, since the image pickup device and the light field image pickup lens according to the embodiments of the disclosure satisfy $$0.07L < \frac{D \times b}{P-a} < 1.06L,$$

the sub images formed by the multiple aperture optical element are relatively large and partially overlapped properly. In this way, the non-overlapped part of each of the sub images can be effectively used to serve as image information to be obtained, so as to increase a valid usage area of image and increase a valid usage area of the image sensor.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image pickup device, comprising:
an imaging lens;
an image sensor; and
a multiple aperture optical element, disposed on a light path between the imaging lens and the image sensor, and comprising a plurality of aperture elements arranged in an array, wherein a ratio of an image side f-number of the imaging lens to an object side f-number of the imaging lens is within a range of 0.25 to 2, and the image pickup device satisfies:

$$0.7L < \frac{D \times b}{P-a} < 1.06L,$$

wherein L is a pitch of the aperture elements, D is a diameter of an exit pupil of the imaging lens, P is a distance between the exit pupil of the imaging lens and an image plane of the imaging lens, a is a distance value from the image plane of the imaging lens to a front principal plane of the multiple aperture optical element, and b is a distance between a back principal plane of the multiple aperture optical element and an imaging plane on the image sensor, wherein when the image plane of the imaging lens is located at one side of the front principal plane away from the image sensor, the value of a is negative, and when the image plane of the imaging lens is located at one side of the front principal plane close to the image sensor, the value of a is positive.

2. The image pickup device as claimed in claim 1, wherein the multiple aperture optical element is a lens array, and the aperture elements are lenses arranged in an array.

3. The image pickup device as claimed in claim 1, wherein the multiple aperture optical element is a light shielding plate, the aperture elements are a plurality of light transmitting holes arranged in an array, and the front principal plane and the back principal plane of the light shielding plate are substantially coincided.

4. The image pickup device as claimed in claim 1, wherein the aperture elements respectively image the exit pupil of the imaging lens to the imaging plane on the image sensor to form a plurality of sub images, wherein the sub images are partially overlapped to each other.

5. The image pickup device as claimed in claim 1, wherein the front principal plane is located between the image plane of the imaging lens and the back principal plane, and the back principal plane is located between the front principal plane and the imaging plane on the image sensor.

6. The image pickup device as claimed in claim 1, wherein a ratio of the image side f-number of the imaging lens to the object side f-number of the imaging lens is within a range from 0.4 to 1.5.

7. The image pickup device as claimed in claim 1, wherein the image pickup device satisfies:

$$0.98L < \frac{D \times b}{P-a} < 1.05L.$$

8. A light field image pickup lens, comprising:
an imaging lens, disposed between an object side and an imaging plane of the light field image pickup lens; and
a multiple aperture optical element, disposed between the imaging lens and the imaging plane of the light field image pickup lens, and comprising a plurality of aperture elements arranged in an array, wherein a ratio of an image side f-number of the imaging lens to an object side f-number of the imaging lens is within a range of 0.25 to 2, and the light field image pickup lens satisfies:

$$0.07L < \frac{D \times b}{P-a} < 1.06L,$$

wherein L is a pitch of the aperture elements, D is a diameter of an exit pupil of the imaging lens, P is a distance between the exit pupil of the imaging lens and an image plane of the imaging lens, a is a distance value from the image plane of the imaging lens to a front principal plane of the multiple aperture optical element, and b is a distance between a back principal plane of the multiple aperture optical element and an imaging plane of the light field image pickup lens, wherein when the image plane of the imaging lens is located at one side of the front principal plane away from the image plane of the light field image pickup lens, the value of a is negative, and when the image plane of the imaging lens is located at one side of the front principal plane close to the image plane of the light field image pickup lens, the value of a is positive.

9. The light field image pickup lens as claimed in claim 8, wherein the multiple aperture optical element is a lens array, and the aperture elements are lenses arranged in an array.

10. The light field image pickup lens as claimed in claim 8, wherein the multiple aperture optical element is a light shielding plate, the aperture elements are a plurality of light transmitting holes arranged in an array, and the front principal plane and the back principal plane of the light shielding plate are substantially coincided.

11. The light field image pickup lens as claimed in claim 8, wherein the aperture elements respectively image the exit pupil of the imaging lens onto the imaging plane of the light field image pickup lens to form a plurality of sub images, wherein the sub images are partially overlapped to each other.

12. The light field image pickup lens as claimed in claim 8, wherein the front principal plane is located between the image plane of the imaging lens and the back principal plane, and the back principal plane is located between the front principal plane and the imaging plane of the light field image pickup lens.

13. The light field image pickup lens as claimed in claim 8, wherein a ratio of the image side f-number of the imaging lens to the object side f-number of the imaging lens is within a range from 0.4 to 1.5.

14. The light field image pickup lens as claimed in claim 8, wherein the image pickup device satisfies:

$$0.98L < \frac{D \times b}{P - a} < 1.05L.$$

* * * * *